March 12, 1929.  A. V. D. WILLGOOS  1,704,815
VALVE TIMING MECHANISM
Filed Nov. 19. 1926  2 Sheets-Sheet 1
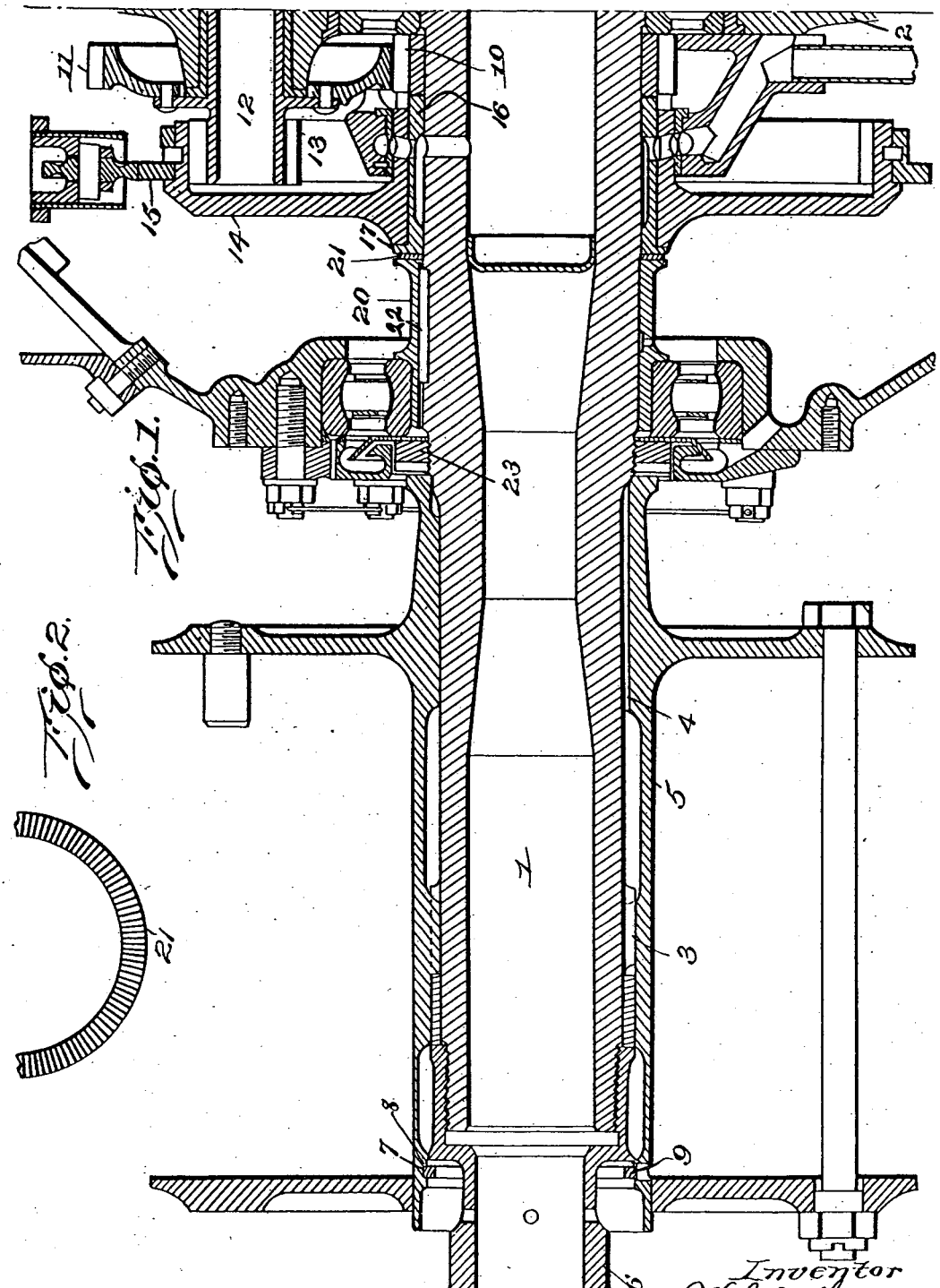

March 12, 1929. A. V. D. WILLGOOS 1,704,815
VALVE TIMING MECHANISM
Filed Nov. 19, 1926 2 Sheets-Sheet 2
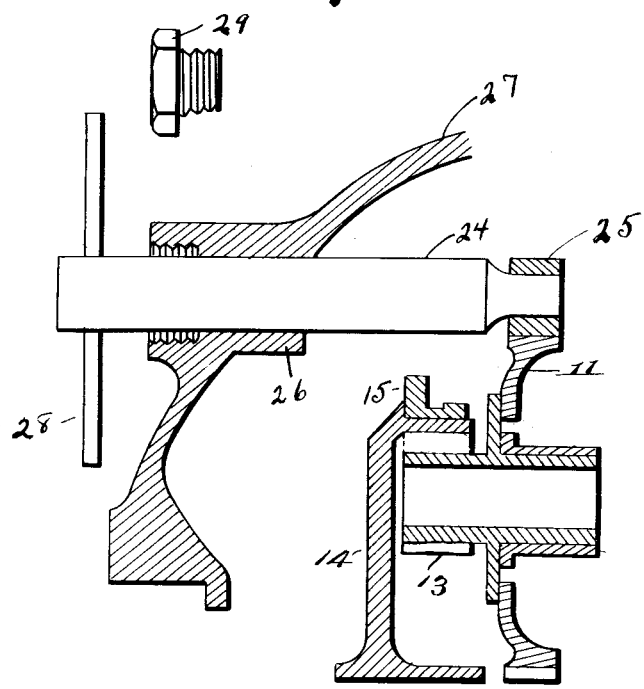

Patented Mar. 12, 1929.

1,704,815

UNITED STATES PATENT OFFICE.

ANDREW V. D. WILLGOOS, OF WEST HARTFORD, CONNECTICUT, ASSIGNOR TO THE PRATT & WHITNEY AIRCRAFT CO., OF HARTFORD, CONNECTICUT.

VALVE-TIMING MECHANISM.

Application filed November 19, 1926. Serial No. 149,376.

This invention relates in general to internal combustion engines and more particularly to a novel and improved mechanism for providing for the adjustment of the valve actuating mechanism of said engines. The structure, hereinafter to be disclosed is directed particularly to improvements of this character as adapted for use on internal combustion engines of the radial type though the improvement to which it relates is in no way restricted to this type of engine.

It is an object of my invention to provide a mechanism whereby the valve actuating cam shaft can be turned relatively to and independently of the drive shaft for the purpose of adjusting the timing of the valves.

A further object of my invention is to provide means for adjusting the valve timing of an engine, operable from the exterior of the engine after it is completely assembled.

It is a further object of my invention to construct my driving connection between the drive shaft and the cam shaft of few and simply constructed and arranged parts which are easily movable to permit of the valve timing adjustment with a minimum of time and effort.

Other objects of my invention will appear in the accompanying specification and claims and will be disclosed in the accompanying drawings in which—

Figure 1 is a longitudinal diametrical section through my device;

Figure 2 is a detail in end elevation of one of my serrated clutch members;

Figure 3 is a partial longitudinal section showing my adjusting means.

Referring now with greater particularity to the drawings it will be seen that my device is comprised as follows:

The crankshaft 1 of the engine 2 is splined at 3 and 4 to engage with the internal splines of a propeller hub 5, and, on its outer end, is screw-threaded to engage with a propeller hub nut 6. The hub 5 is provided with a groove 7 cut into the bore thereof and is of such diameter that it barely clears a flange 8 on the nut 6. After the nut 6 is screwed into position, holding the propeller hub in place, a split ring 9 is snapped into the groove 7 preventing any accidental withdrawal of the hub nut by reason of the fact that it extends diametrically inwardly of the flange 8. To remove the nut 6 it is necessary only to remove the ring by springing it out of its groove and then unscrewing the nut. If the propeller hub binds on the shaft the ring may be left in position in its groove and the hub retracted from the shaft by unscrewing the nut.

A gear 10 is rotatably mounted on the crankshaft and is adapted to drivably engage a gear 11 mounted on an idler shaft 12 which is mounted on the engine. A pinion 13, also mounted on the shaft 12, drivably engages the internal gear 14, which, on its outer surface, carries the valve actuating cam 15. In motors of the radial type, such as is disclosed in this application, the cam 15 operates all of the valves of the engine. The gear 14 is rotatable on the sleeve 16 which is provided at its outer end with a serrated disk 17 adapted to function as one part of a clutch. The sleeve is freely rotatable with respect to the shaft 1 except when the clutch member 17 is in operative engagement with its complementary clutch member.

A sleeve 20 is slidably mounted on the shaft 1 and at its inner end is provided with a radially serrated clutch disk 21 adapted to drivably engage the clutch disk 17. The sleeve 20 is keyed to the shaft 1 by means of a key 22. A nut 23, screw-threadedly engaging the shaft at the outer end of the sleeve 20 serves to hold the clutch faces 21 and 17 tightly in engagement. When it is desired to change the adjustment of the valves, the nut 23 is slacked off and the sleeve 20 slit outwardly until its clutch face is free from that of the sleeve 16. The gear 10 is then freely rotatable on the shaft and, by its rotation, turns the cam 15 on the gear 14 to adjust the valves.

In Fig. 3 I show my adjusting means. The cam drive gearing of an engine is ordinarily inclosed, and to enable the valve timing to be adjusted while the engine is completely assembled, I construct my device as follows: A bearing 26 is provided in the engine frame 27 and during normal operation is closed by plug 29. When it is desired to change or adjust the timing of the valves, plug 29 is removed and wrench 24 is inserted in bearing 26. Wrench 24 is formed with gear teeth 25 suitable to engage with gear 11, and bearing 26 is so located as to allow proper engagement of 25 and 11. A handle 28 facilitates turning of the wrench by the operator. It will be understood that wrench 24, 25 may be arranged to engage any other gear of the cam driving train, if more convenient.

From the foregoing it will be seen that my device operates as follows:

The crankshaft drives the sleeve 20 which is keyed thereto, and, through the clutch 17—21, drives the sleeve 16, the gear 10, the gear 11, the shaft 12, the pinion 13, and the cam gear 14 actuating the valves. For the purpose of adjusting the timing of the valves it is necessary, only, to slack off the nut 23 to destroy the driving connection between the clutch members to permit the sleeve 16 to be rotated freely and independently of the shaft 1.

Wrench 24 is inserted in bearing 26 so its teeth 25 engage with gear 11. Turning the wrench then rotates gears 11, 13, 14, 10 and sleeve 16.

It is to be understood that I do not wish to limit my invention to the exact form of structure disclosed but to restrict the same only as set forth in the accompanying claims.

I claim—

1. In combination, in an internal combustion engine, a crank-shaft. a cam for operating the valves of said engine, and a releasable connection between said crank-shaft and said cam including a sleeve geared to said cam, a sleeve keyed to said shaft and slidable longitudinally thereof, means providing a releasable clutch between said sleeves.

2. In combination, in an internal combustion engine, a crank-shaft, a cam for operating the valves of said engine, a releasable connection between said crank-shaft and said cam, and externally operable means for adjusting the timing of said cam relative to said crank-shaft when the connection between said crank shaft and said cam is released.

3. In combination, in an internal combustion engine, a crank-shaft, a cam operating the valves of said engine, a releasable connection between said crank-shaft and said cam, and externally operable means insertable through the casing of said engine for adjusting the timing of said cam relative to said crank-shaft when the connection between said crank-shaft and said cam is released.

In testimony whereof I affix my signature.

ANDREW V. D. WILLGOOS.